(12) United States Patent
Sakai et al.

(10) Patent No.: US 11,038,167 B2
(45) Date of Patent: Jun. 15, 2021

(54) CATHODE ACTIVE MATERIAL, POSITIVE ELECTRODE FOR LITHIUM ION SECONDARY BATTERY, AND LITHIUM ION SECONDARY BATTERY

(71) Applicant: SUMITOMO CHEMICAL CO., LTD., Tokyo (JP)

(72) Inventors: Tomohiro Sakai, Chiyoda-ku (JP); Tsubasa Takasugi, Chiyoda-ku (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 186 days.

(21) Appl. No.: 14/982,530

(22) Filed: Dec. 29, 2015

(65) Prior Publication Data

US 2016/0218358 A1 Jul. 28, 2016

(30) Foreign Application Priority Data

Jan. 23, 2015 (JP) .............................. JP2015-011028

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/00* (2013.01); *C01G 53/006* (2013.01); *C01G 53/44* (2013.01);
(Continued)

(58) Field of Classification Search
CPC ...... H01M 4/505; H01M 4/364; H01M 4/366; H01M 4/525; H01M 10/052;
(Continued)

(56) References Cited

U.S. PATENT DOCUMENTS

2015/0030922 A1* 1/2015 Kobayashi ............ H01M 4/622
429/217

FOREIGN PATENT DOCUMENTS

| JP | WO 2013084990 A1 * | 6/2013 | ............ H01M 4/622 |
| JP | 2013-137962 | 7/2013 | |
| WO | WO 2014/192758 A1 | 12/2014 | |

OTHER PUBLICATIONS

Kang, S-H., and K. Amine. "Synthesis and electrochemical properties of layer-structured 0.5 Li (Ni 0.5 Mn 0.5) O 2-0.5 Li (Li 1/3 Mn 2/3) O 2 solid mixture." Journal of Power sources 124.2 (2003): 533-537.*

(Continued)

*Primary Examiner* — Miriam Stagg
*Assistant Examiner* — Lilia Nedialkova
(74) *Attorney, Agent, or Firm* — Oblon, McClelland, Maier & Neustadt, L.L.P.

(57) ABSTRACT

A cathode active material for a positive electrode for a lithium ion secondary battery, comprising a lithium-containing composite oxide represented by $aLi(Li_{1/3}Mn_{2/3})O_2 \cdot (1-a)LiMO_2$ (M: at least one transition metal element selected from Ni, Co and Mn, and $0<a<1$), wherein in an X-ray diffraction pattern of the lithium-containing composite oxide, the ratio of the height ($H_{020}$) of a peak of (020) plane assigned to a crystal structure with space group C2/m to the height ($H_{003}$) of a peak of (003) plane assigned to a crystal structure with space group R-3m (i.e. $H_{020}/H_{003}$) is at most 0.038, and the ratio of the height ($H_{110}$) of a peak of (110) plane assigned to a crystal structure with space group C2/m to the height ($H_{003}$) of a peak of (003) plane assigned to a crystal structure with space group R-3m (i.e. $H_{110}/H_{003}$) is at most 0.013.

22 Claims, 3 Drawing Sheets

(51) Int. Cl.
*C01G 53/00* (2006.01)
*H01M 4/36* (2006.01)
*H01M 4/02* (2006.01)
*H01M 10/052* (2010.01)

(52) U.S. Cl.
CPC ........... *H01M 4/364* (2013.01); *H01M 4/366* (2013.01); *H01M 4/525* (2013.01); *C01P 2002/72* (2013.01); *C01P 2002/74* (2013.01); *C01P 2006/12* (2013.01); *H01M 10/052* (2013.01); *H01M 2004/021* (2013.01)

(58) Field of Classification Search
CPC ............. H01M 2004/021; C01G 53/00; C01G 53/006; C01G 54/44; C01G 53/44; C01P 2002/72; C01P 2002/74; C01P 2006/12; Y02E 60/10
See application file for complete search history.

(56) References Cited

OTHER PUBLICATIONS

Wang, Jun, et al. "Electrochemical properties of 0.6 Li [Li 1/3 Mn 2/3] O 2-0.4 LiNi x Mn y Co 1-x-y O 2 cathode materials for lithium-ion batteries." Journal of Power Sources 218 (2012): 128-133. (Year: 2012).*

Sivaprakash, S., and S. B. Majumder. "Synthesis and Electrochemical Characteristics of Li (Ni0. 375Mn0. 375Co0. 25) 02—Li (Li 1/3Mn2/3) O2 Cathode Materials for Li Rechargeable Batteries." Journal of The Electrochemical Society 157.4 (2010): A418-A422. (Year: 2010).*

Jacob, Clement, et al. "A new approach to investigate Li 2 MnO 3 and Li (Ni 0.5 Mn 0.3 Co 0.2) O 2 mixed phase cathode materials." Journal of Materials Chemistry A 2.7 (2014): 2283-2289. (Year: 2014).*

Jin-Myoung Lim et al., "Underlying mechanisms of the synergistic role of $Li_2MnO_3$ and $LiNi_{1/3}Co_{1/3}Mn_{1/3}O_2$ in high-Mn, Li-rich oxides", Phys. Chem. Chem. Phys., 2016, 18, 11411-11421.

Shaozhi Gui et al., "Enhancing the electrochemical performance of $LiNi_{0.8}Co_{0.15}Al_{0.05}O_2$ by a facile doping method: Spray-drying doping with liquid polyacrylonitrile", Journal of Power Sources 409 (2019), 102-111.

XRD patterns made based on JCPDS data of $Li_2MnO_2$ (PDF#84-1634).

XRD patterns made based on JCPDS data of $LiNiO_2$ (PDF#74-0919).

Tosoh Corporation. "Tosoh Technical Report No. T1824", Aug. 13, 2018 (with partial translation).

* cited by examiner

CATHODE ACTIVE MATERIAL, POSITIVE ELECTRODE FOR LITHIUM ION SECONDARY BATTERY, AND LITHIUM ION SECONDARY BATTERY

FIELD OF INVENTION

The present invention relates to a cathode active material, a positive electrode for a lithium ion secondary battery, and a lithium ion secondary battery.

BACKGROUND ART

As a cathode active material contained in a positive electrode of a lithium ion secondary battery, a lithium-containing composite oxide, particularly $LiCoO_2$, is well known. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as the discharge capacity) is required.

As a cathode active material which may be able to further increase the discharge capacity of a lithium ion secondary battery, a cathode active material having high Li and Mn contents i.e. a so-called lithium rich cathode active material has attracted attention. However, a lithium ion secondary battery using such a lithium rich cathode active material has a problem such that the characteristics not to undergo deterioration of the discharge capacity at the time of discharging at a high discharge rate (hereinafter referred to as the rate characteristics) are insufficient.

As a lithium rich cathode active material capable of obtaining a lithium ion secondary battery excellent in the discharge capacity and rate characteristics, the following one has been proposed.

A cathode active material represented by $Li_{2-x}Mn_{1-x}Co_xNi_xO_3$ ($0.3 \leq X \leq 0.5$) wherein in an X-ray diffraction pattern, the ratio of the integrated intensity ($I_{020}$) of a peak of (020) plane assigned to a crystal structure with space group C2/m to the integrated intensity ($I_{003}$) of a peak of (003) plane assigned to a crystal structure with space group R-3m (i.e. $I_{020}/I_{003}$) is from 0.011 to 0.031 (Patent Document 1).

It is disclosed that in the cathode active material, the proportions of Co and Ni are high, whereby the crystal of the cathode active material has a proper defective layer, and the rate characteristics of the lithium ion secondary battery are improved. However, since Co is expensive, it is not possible to suppress the cost of the lithium ion secondary battery using the cathode active material having a high Co proportion, to be low.

PRIOR ART DOCUMENT

Patent Document

Patent Document 1: JP-A-2013-137962

SUMMARY OF INVENTION

Technical Problem

It is an object of the present invention to provide a lithium rich cathode active material capable of obtaining a lithium ion secondary battery excellent in the discharge capacity and also excellent in the rate characteristics irrespective of the content of Co in the cathode active material; a positive electrode for a lithium ion secondary battery, capable of obtaining a lithium ion secondary battery excellent in the discharge capacity and also excellent in the rate characteristics irrespective of the content of Co in the cathode active material; and a lithium ion secondary battery excellent in the discharge capacity and also excellent in the rate characteristics irrespective of the content of Co in the cathode active material.

Solution to Problem

The present invention provides the following embodiments.

[1] A cathode active material comprising a lithium-containing composite oxide, wherein the lithium-containing composite oxide is represented by $aLi(Li_{1/3}Mn_{2/3})O_2 \cdot (1-a)LiMO_2$ (wherein M is at least one transition metal element selected from Ni, Co and Mn, and a is more than 0 and less than 1), in an X-ray diffraction pattern of the lithium-containing composite oxide, the ratio of the height ($H_{020}$) of a peak of (020) plane assigned to a crystal structure with space group C2/m to the height ($H_{003}$) of a peak of (003) plane assigned to a crystal structure with space group R-3m (i.e. $H_{020}/H_{003}$) is at most 0.038, and in an X-ray diffraction pattern of the lithium-containing composite oxide, the ratio of the height ($H_{110}$) of a peak of (110) plane assigned to a crystal structure with space group C2/m to the height ($H_{003}$) of a peak of (003) plane assigned to a crystal structure with space group R-3m (i.e. $H_{110}/H_{003}$) is at most 0.013.

[2] The cathode active material according to [1], wherein in the lithium-containing composite oxide, the ratio of the molar amount of Ni to the total molar amount (X) of Ni, Co and Mn (i.e. Ni/X) is from 0.15 to 0.45, the ratio of the molar amount of Co thereto (i.e. Co/X) is from 0 to 0.15, and the ratio of the molar amount of Mn thereto (i.e. Mn/X) is from 0.55 to 0.85.

[3] The cathode active material according to [1] or [2], wherein the specific surface area of the cathode active material is from 0.5 to 4 $m^2/g$.

[4] The cathode active material according to any one of [1] to [3], wherein the volume-based accumulative 50% size ($D_{50}$) of the cathode active material is from 3 to 15 μm.

[5] The cathode active material according to any one of [1] to [4], wherein in an X-ray diffraction pattern of the lithium-containing composite oxide, the crystallite diameter obtained by the Scherrer equation from a peak of (003) plane assigned to a crystal structure with space group R-3m is from 30 to 120 nm.

[6] The cathode active material according to any one of [1] to [5], wherein in an X-ray diffraction pattern of the lithium-containing composite oxide, the crystallite diameter obtained by the Scherrer equation from a peak of (110) plane assigned to a crystal structure with space group R-3m is from 10 to 80 nm.

[7] A positive electrode for a lithium ion secondary battery, which comprises the cathode active material as defined in any one of [1] to [6], an electrically conductive material and a binder.

[8] A lithium ion secondary battery, which comprises the positive electrode for a lithium ion secondary battery as defined in [7], a negative electrode and a non-aqueous electrolyte.

Advantageous Effects of Invention

By the cathode active material of the present invention, it is possible to obtain a lithium ion secondary battery excellent in the discharge capacity and also excellent in the rate characteristics irrespective of the content of Co in the cathode active material.

By the positive electrode for a lithium ion secondary battery of the present invention, it is possible to obtain a lithium ion secondary battery excellent in the discharge capacity and also excellent in the rate characteristics irrespective of the content of Co in the cathode active material.

The lithium ion secondary battery of the present invention is excellent in the discharge capacity and also excellent in the rate characteristics irrespective of the content of Co in the cathode active material.

DETAILED DESCRIPTION OF INVENTION

The following definitions of terms are applied to this specification including Claims.

The "specific surface area" is a value measured by a BET (Brunauer, Emmet, Teller) method. In the measurement of the specific surface area, nitrogen gas is used as an absorption gas.

The "$D_{50}$" is a particle size at a point of 50% on an accumulative volume distribution curve which is drawn by obtaining the particle size distribution on the volume basis and taking the whole to be 100%, that is, a volume-based accumulative 50% size.

The "particle size distribution" is obtained from the frequency distribution and accumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

The "crystallite diameter" is obtained by the following Scherrer equation from a diffraction angle 2θ (deg) and half-value width B (rad) of a specific peak in an X-ray diffraction pattern.

$$D_{abc}=(0.9\lambda)/(B\cos\theta)$$

wherein $D_{abc}$ is a crystallite diameter of (abc) plane, and λ is the wavelength of X-rays.

The "integral breadth" means the width of a rectangle with the same area and height as a specific peak in an X-ray diffraction pattern.

The expression "Li" means a Li element, not a Li metal simple substance, unless otherwise specified. The same applies to expressions of other elements such as Ni, Co, Mn, etc.

The composition analysis of a lithium-containing composite oxide is carried out by inductively-coupled plasma spectrometry (hereinafter referred to as ICP). Further, the ratio of elements in a lithium-containing composite oxide is a value with respect to the lithium-containing composite oxide before the first charging (also called activation treatment).

Cathode Active Material

The cathode active material of the present invention (hereinafter referred to as the present active material) comprises, as the main component, secondary particles having primary particles of a lithium-containing composite oxide (1) (hereinafter referred to as a composite oxide (1)) agglomerated. The present active material may be in such a form that the surface of the secondary particles is covered with a covering material (2).

The chemical composition of the composite oxide (1) is represented by the formula $aLi(Li_{1/3}Mn_{2/3})O_2$-$(1-a)LiMO_2$ (wherein M is at least one transition metal element selected from Ni, Co and Mn, and a is more than 0 and less than 1). The present active material comprises the composite oxide (1) having the above chemical composition, whereby the discharge capacity of a lithium ion secondary battery using the present active material can be made high.

In the above chemical composition, M is at least one transition metal element selected from Ni, Co and Mn. With a view to obtaining a cathode active material capable of further increasing the discharge capacity of the lithium ion secondary battery, M preferably contains Ni and Mn, and more preferably contains Ni, Co and Mn.

The Ni content in the composite oxide (1) is preferably from 0.15 to 0.45 by the ratio (Ni/X) of the molar amount of Ni to the total molar amount (X) of Ni, Co and Mn. When Ni/X in the composite oxide (1) is at least 0.15, it is possible to obtain a cathode active material capable of making the discharge voltage of the lithium ion secondary battery higher. When Ni/X in the composite oxide (1) is at most 0.45, it is possible to obtain a cathode active material capable of making the discharge capacity of the lithium ion secondary battery higher. Further, with a view to obtaining a cathode active material capable of making the discharge capacity of the lithium ion secondary battery higher, the upper limit for Ni/X is more preferably 0.4, further preferably 0.35.

The Co content in the composite oxide (1) is preferably from 0 to 0.15 by the ratio (Co/X) of the molar amount of Co to the total molar amount (X) of Ni, Co and Mn. When the composite oxide (1) containing Co is used, it is possible to obtain a lithium ion secondary battery excellent further in the rate characteristics. When the composite oxide (1) wherein Co/X is at most 0.15, it is possible to obtain a lithium ion secondary battery excellent further in the cycle characteristics. Co/X in the composite oxide (1) is more preferably from 0 to 0.12, further preferably from 0 to 0.09. By reducing the Co content in the composite oxide (1), it is possible to suppress the cost of the cathode active material or the lithium ion secondary battery.

The Mn content in the composite oxide (1) is preferably from 0.55 to 0.85 by the ratio (Mn/X) of the molar amount of Mn to the total molar amount (X) of Ni, Co and Mn.

When Mn/X in the composite oxide (1) is at least 0.55, it is possible to obtain a cathode active material capable of making the discharge voltage of the lithium ion secondary battery higher. When Mn/X in the composite oxide (1) is at most 0.8, it is possible to obtain a cathode active material capable of making the discharge voltage of the lithium ion secondary battery higher. Mn/X in the composite oxide (1) is more preferably from 0.6 to 0.8.

The Li content in the composite oxide (1) is preferably from 1.1 to 1.8 by the ratio (Li/X) of the molar amount of Li to the total molar amount (X) of Ni, Co and Mn. When Li/X is from 1.1 to 1.8, the discharge capacity of the lithium ion secondary battery can be made higher. Li/X is more preferably from 1.1 to 1.7, further preferably from 1.1 to 1.65.

In the above chemical composition of the composite oxide (1), a is more than 0 and less than 1. When a is more than 0, the composite oxide (1) has a lithium excess phase represented by $Li(Li_{1/3}Mn_{2/3})O_2$, and the lithium ion secondary battery having the present active material exhibits a high discharge capacity. With a view to further increasing the discharge capacity of the lithium ion secondary battery, a is preferably at least 0.1, more preferably at least 0.2. With a view to further increasing the discharge voltage of the lithium ion secondary battery, a is preferably at most 0.78, more preferably at most 0.75.

The composite oxide (1) is preferably a compound represented by a chemical composition of $aLi(Li_{1/3}Mn_{2/3})O_2 \cdot (1-a)LiNi_\alpha Co_\beta Mn_\gamma O_2$ (wherein α is from 0.5 to 0.833, β is from 0 to 0.75, γ is from 0.167 to 0.5, and α>γ).

It is considered that in the above chemical composition, when α>γ, cation mixing decreases in the layered rock salt crystal structure with space group R-3m, whereby the rate characteristics of the lithium ion secondary battery are improved. This is considered to be such that when α>γ, the valency of Ni in the layered rock salt crystal structure with space group R-3m becomes higher than bi-valent, and in the crystal structure, the ion radii of Ni ions and Li ions become different in size. It is considered that if the ion radii of Ni ions and Li ions are different, a phenomenon wherein these ions are substituted (cation mixing), is reduced.

The composite oxide (1) may contain other elements other than Li, Ni, Co and Mn, as the case requires. Such other elements may, for example, be P, Mg, Ca, Ba, Sr, Al, Cr, Fe, Ti, Zr, Y, Nb, Mo, Ta, W, Ce, La, etc. The composite oxide (1) preferably contain P, whereby the cycle characteristics of the lithium ion secondary battery will be better. With a view to further increasing the discharge capacity of the lithium ion secondary battery, the composite oxide (1) preferably contains at least one member selected from the group consisting of Mg, Al, Cr, Fe, Ti and Zr.

The composite oxide (1) is a solid solution of $Li(Li_{1/3}Mn_{2/3})O_2$ (lithium excess phase) having a layered rock salt crystal structure with space group C2/m and $LiMO_2$ having a layered rock salt crystal structure with space group R-3m. By an X-ray diffraction measurement, it can be confirmed that the solid solution type composite oxide (1) has such crystal structures.

The X-ray diffraction measurement is carried out by the method as disclosed in Examples. The peak of (003) plane assigned to the crystal structure with space group R-3m is a peak which appears at 2θ=18 to 20 deg. The peak of (020) plane of the crystal structure with space group C2/m is a peak which appears at 2θ=20 to 22 deg. The peak of (110) plane assigned to the crystal structure with space group C2/m is a peak which appears at 2θ=21 to 23 deg. The peak of (110) plane assigned to the crystal structure with space group R-3m is a peak which appears at 2θ=64 to 66 deg.

In the present active material, in an X-ray diffraction pattern of the composite oxide (1), the ratio of the height ($H_{020}$) of a peak of (020) plane assigned to a crystal structure with space group C2/m to the height ($H_{003}$) of a peak of (003) plane assigned to a crystal structure with space group R-3m (i.e. $H_{020}/H_{003}$) is at most 0.038, preferably at most 0.0365, more preferably at most 0.035.

Further, in an X-ray diffraction pattern of the composite oxide (1), the ratio of the height ($H_{110}$) of a peak of (110) plane assigned to a crystal structure with space group C2/m to the height ($H_{003}$) of a peak of (003) plane assigned to a crystal structure with space group R-3m (i.e. $H_{110}/H_{003}$) is at most 0.013, preferably at most 0.0126, more preferably at most 0.0122.

In a composite oxide (1) of solid solution type, diffusivity of Li ions is low in the crystal structure of the lithium excess phase as between the two crystal structures. In the present active material, the crystal structure of the composite oxide (1) has been adjusted so that the specific peak ratios in the X-ray diffraction pattern become to be within the specific ranges, whereby the diffusivity of Li ions in the lithium excess phase is considered to have been made high. Accordingly, the lithium ion secondary battery using the present cathode active material containing the composite oxide (1) is considered to be excellent in the rate characteristics.

In the X-ray diffraction pattern, in a case where the integrated intensities of peaks are the same, the lower the height of a peak, the wider the width of the peak. Here, the width of a peak is in an inverse relation to the crystallite diameter, and therefore, the width of a peak being wide means that the crystallite diameter is small. Accordingly, when $H_{003}$ is used as the base, $H_{020}$ and $H_{110}$ being low means that the growth of the domain of the crystal phase of $Li(Li_{1/3}Mn_{2/3})O_2$ is insufficient, and the crystallinity is low. And, if the crystallinity of $Li(Li_{1/3}Mn_{2/3})O_2$ is low, the activating energy to let Li ions diffuse in crystal of the composite oxide (1) becomes low, whereby the diffusivity of Li ions in crystal is considered to be improved. As a result, when a cathode active material containing the composite oxide (1) is used, the rate characteristics of the lithium ion secondary battery are considered to become good.

$H_{020}/H_{003}$ is preferably at least 0.005, whereby the cycle characteristics of the lithium ion secondary battery can easily be made good.

$H_{110}/H_{003}$ is preferably at least 0.04, whereby the cycle characteristics of the lithium ion secondary battery can easily be made good.

In the X-ray diffraction pattern of the composite oxide (1), the integral breadth ($W_{020}$) of a peak of (020) plane assigned to a crystal structure with space group C2/m is preferably at least 0.38 deg, more preferably at least 0.45 deg, further preferably at least 0.5 deg. The integral breadth is in an inverse relation to the crystallite diameter.

The integral breadth being wide means that the crystallite diameter is small. When $W_{020}$ is at least 0.38 deg, the growth of the domain of the crystal phase of $Li(Li_{1/3}Mn_{2/3})O_2$ tends to be insufficient, and the crystallinity tends to be low. If the crystallinity of $Li(Li_{1/3}Mn_{2/3})O_2$ is low, the activating energy to let Li ions diffuse in crystal of the composite oxide (1) becomes low, whereby the diffusivity of Li ions in crystal is considered to be improved. As a result, it is considered possible to obtain a cathode active material capable of further improving the rate characteristics of the lithium ion secondary battery.

$W_{020}$ is preferably at most 1.8 deg, with a view to further improving the cycle characteristics of the lithium ion secondary battery.

In a crystallite having a layered rock salt crystal structure with space group R-3m, during charging and discharging, each Li diffuses in the a-b axis direction in the same layer, and getting in and out of Li occurs at ends of the crystallite. The c-axis direction of the crystallite is the lamination direction, and in a shape being long in the c-axis, the number of ends where Li can get in and out, increases as compared with other crystallites having the same volume. The crystallite diameter in the a-b axis direction is a crystallite diameter ($D_{110}$) obtained by the Scheller equation from a peak of (110) plane assigned to a crystal structure with space group R-3m in the X-ray diffraction pattern of the composite oxide (1). The crystallite diameter in the c-axis direction is a crystallite diameter ($D_{003}$) obtained by the Scheller equation from a peak of (003) plane of space group R-3m in the X-ray diffraction pattern of the composite oxide (1).

In the composite oxide (1), $D_{003}$ is preferably from 30 to 120 nm, more preferably from 40 to 110 nm, further preferably from 50 to 110 nm. When $D_{003}$ is at least 30 nm, it is possible to obtain a cathode active material capable of further improving the cycle characteristics of the lithium ion secondary battery. When $D_{003}$ is at most 120 nm, it is possible to obtain a cathode active material capable of further improving the discharge capacity of the lithium ion secondary battery.

In the composite oxide (1), $D_{110}$ is preferably from 10 to 80 nm, more preferably from 15 to 80 nm, further preferably from 15 to 70 nm. When $D_{110}$ is at least 10 nm, the stability of the crystal structure of the composite oxide (1) will be improved. When Dino is at most 80 nm, it is possible to obtain a cathode active material capable of further improving the cycle characteristics of the lithium ion secondary battery.

If the present active material has a covering (2), the frequency in contact of the composite oxide (1) and the electrolyte decreases. As a result, it is possible to reduce elution, from crystal into the electrolyte, of transition metal elements such as Mn, etc. in the composite oxide (1). It is thereby possible to further improve the cycle characteristics of the lithium ion secondary battery.

As the covering (2), an Al compound is preferred, and at least one member selected from the group consisting of $Al_2O_3$, AlOOH and $Al(OH)_3$ is more preferred, since it is thereby possible to improve the cycle characteristics of the lithium ion secondary battery without lowering other battery characteristics.

The covering (2) may be present on the surface of the secondary particles of the composite oxide (1). The covering (2) may be present on a part of the surface of the secondary particles, or may be present over the entire surface of the secondary particles.

The specific surface area of the present active material is preferably from 0.5 to 4 $m^2/g$, more preferably from 1 to 4 $m^2/g$, further preferably from 1 to 3.5 $m^2/g$. When the specific surface area is at least the above lower limit value, the discharge capacity of the lithium ion secondary battery can be made higher. When the specific surface area is at most the above upper limit value, the cycle characteristics of the lithium ion secondary battery can be made better.

The specific surface area of the present active material is measured by the method disclosed in Examples.

$D_{050}$ of the present active material is preferably from 3 to 15 μm, more preferably from 3 to 12 μm, further preferably from 3 to 10 μm. When $D_{50}$ is within the above range, the discharge capacity of the lithium ion secondary battery can easily be made high.

Process for Producing Cathode Active Material

The present active material may be produced, for example, by a method comprising the following steps (a) to (c).

(a) A step of obtaining a precursor containing transition metal elements of Mn and at least one member selected from Ni and Co.
(b) A step of mixing the precursor and a lithium compound, and the obtained mixture is fired to obtain a composite oxide (1).
(c) As the case requires, a step of forming a covering (2) on the surface of the composite oxide (1).

Step (a)

The precursor may be prepared, for example, by a method of obtaining a compound containing transition metal elements of Mn and at least one member selected from Ni and Co, by a coprecipitation method.

The coprecipitation method may, for example, be an alkali coprecipitation method or a carbonate coprecipitation method.

The alkali coprecipitation method is a method wherein an aqueous metal salt solution containing transition metal elements of Mn and at least one member selected from Ni and Co, and a pH adjusting liquid containing a strong alkali, are continuously supplied to a reaction tank and mixed, and while maintaining the pH in the mixture to be constant, hydroxides containing transition metal elements of Mn and at least one member selected from Ni and Co, are precipitated.

The carbonate coprecipitation method is a method wherein an aqueous metal salt solution containing transition metal elements of Mn and at least one member selected from Ni and Co, and an aqueous carbonate solution containing an alkali metal, are continuously supplied to a reaction tank and mixed, and in the mixture, carbonates containing transition metal elements of Mn and at least one member selected from Ni and Co, are precipitated.

As the coprecipitation method, the alkali coprecipitation method is preferred in that the cycle characteristics of the lithium ion secondary battery can thereby easily be made good.

Now, the precipitation method for hydroxides will be described in detail with reference to the alkali coprecipitation method.

The metal salts may, for example, be nitrates, acetates, chlorides or sulfates of the respective transition metal elements, and sulfates are preferred in that the material costs are relatively inexpensive and excellent battery characteristics are thereby obtainable. As the metal salts, a sulfate of Ni, a sulfate of Mn and a sulfate of Co are more preferred.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The ratio of Ni, Co and Mn in the aqueous metal salt solution is adjusted to be the same as the ratio of Ni, Co and Mn to be contained in the finally obtainable composite oxide (1).

The total concentration of Mn and at least one member selected from Ni and Co in the aqueous metal salt solution is preferably from 0.1 to 3 mol/kg, more preferably from 0.5 to 2.5 mol/kg. When the total concentration of Mn and at least one member selected from Ni and Co, is at least the above lower limit value, the productivity will be excellent. When the total concentration of Mn and at least one member selected from Ni and Co, is at most the above upper limit value, the metal salts can be sufficiently dissolved in water.

The aqueous metal salt solution may contain an aqueous medium other than water.

The aqueous medium other than water, may, for example, be methanol, ethanol, 1-propanol, 2-propanol, ethylene glycol, propylene glycol, diethylene glycol, dipropylene glycol, polyethylene glycol, butanediol or glycerine. The proportion of the aqueous medium other than water is preferably from 0 to 20 parts by mass, more preferably from 0 to 10 parts by mass, particularly preferably from 0 to 1 part by mass, per 100 parts by mass of water from the viewpoint of safety, environmental aspect, handling efficiency and costs.

The pH adjusting liquid is preferably an aqueous solution containing a strong alkali.

The strong alkali is preferably at least one member selected from the group consisting of sodium hydroxide, potassium hydroxide and lithium hydroxide.

To the mixed liquid, a complexing agent (aqueous ammonia or an aqueous ammonium sulfate solution) may be added to adjust the solubility of Mn ions and at least one member selected from Ni ions and Co ions.

The aqueous metal salt solution and the pH adjusting liquid are preferably mixed with stirring in the reaction tank.

The stirring device may, for example, be a three-one motor, and the stirring blades may, for example, be anchor-type, propeller-type or paddle-type.

The reaction temperature is preferably from 20 to 80° C., more preferably from 25 to 60° C., with a view to accelerating the reaction.

Mixing of the aqueous metal salt solution and the pH adjusting liquid is preferably conducted in a nitrogen atmosphere or in an argon atmosphere, with a view to preventing oxidation of the hydroxides, and it is particularly preferably conducted in a nitrogen atmosphere from the viewpoint of costs.

During the mixing of the aqueous metal salt solution and the pH adjusting liquid, it is preferred to maintain the pH in the reaction tank to be a pH set within a range of from 10 to 12, with a view to letting the coprecipitation reaction proceed properly. When the mixing is conducted at a pH of at least 10, coprecipitates are deemed to be hydroxides.

As the method for precipitating hydroxides, two types may be mentioned, i.e. a method (hereinafter referred to as a concentration method) of carrying out the precipitation reaction while concentrating hydroxides by withdrawing the mixed liquid in the reaction tank through a filter (e.g. a filter cloth), and a method (hereinafter referred to as an overflow method) of carrying out the precipitation reaction while maintaining the concentration of hydroxides to be low by withdrawing the mixed liquid in the reaction tank, together with the hydroxides, without using a filter. The concentration method is preferred, with a view to producing hydroxides having a narrow particle size distribution.

The precursor is preferably washed to remove impurity ions. The washing method may, for example, be a method of repeating pressure filtration and dispersion into distilled water. Such washing is preferably repeated until the electrical conductivity of the filtrate or the supernatant at the time when the precursor is dispersed in distilled water, becomes to be at most 50 mS/m, more preferably repeated until the electrical conductivity becomes to be at most 20 mS/m.

After the washing, the precursor may be dried as the case requires.

The drying temperature is preferably from 60 to 200° C., more preferably from 80 to 130° C. When the drying temperature is at least the above lower limit value, the drying time can be shortened. When the drying temperature is at most the above upper limit value, it is possible to prevent the progress of oxidation of the precursor.

The drying time may be properly set depending upon the amount of the precursor and is preferably from 1 to 300 hours, more preferably from 5 to 120 hours.

The specific surface area of the precursor is preferably from 3 to 60 m$^2$/g, more preferably from 5 to 40 m$^2$/g. When the specific surface area of the precursor is within the above range, the specific surface area of the present active material can be easily controlled to be within a preferred range. Here, the specific surface area of the precursor is a value measured after the precursor is dried at 120° C. for 15 hours.

$D_{50}$ of the precursor is preferably from 3 to 15.5 μm, more preferably from 3 to 12.5 μm, further preferably from 3 to 10.5 μm. When $D_{50}$ of the precursor is within the above range, $D_{50}$ of the present active material can be easily controlled to be within a preferred range.

Step (b)

The precursor and a lithium compound are mixed and fired, whereby a composite oxide (1) will be formed.

The lithium compound is preferably one member selected from the group consisting of lithium carbonate, lithium hydroxide and lithium nitrate. Lithium carbonate is more preferred from the viewpoint of handling efficiency.

The method for mixing the precursor and the lithium compound may, for example, be a method of using a rocking mixer, a Nauta mixer, a spiral mixer, a cutter mill or a V mixer.

The ratio of the molar amount of Li contained in the lithium compound to the total molar amount ($X_2$) of Ni, Co and Mn contained in the precursor (i.e. Li/$X_2$) is preferably from 1.1 to 1.8, more preferably from 1.1 to 1.7, further preferably from 1.1 to 1.65. When Li/$X_2$ is within the above range, the Li ratio in the composite oxide (1) can be made to be within a desired range, and the discharge capacity of the lithium ion secondary battery can be made high. Li/$X_2$ is preferably adjusted so that α>β in the chemical composition of aLi(Li$_{1/3}$Mn$_{2/3}$)O$_2$·(1-a)LiNi$_\alpha$Co$_\beta$Mn$_\gamma$O$_2$, whereby it is easy to make the discharge capacity of the lithium ion secondary battery to be high.

The firing apparatus may, for example, be an electric furnace, a continuous firing furnace or a rotary kiln.

During the firing, the precursor is oxidized, and therefore, the firing is preferably conducted in the atmospheric air, and it is particularly preferred to carry out the firing while supplying air.

The supply rate of air is preferably from 10 to 200 mL/min., more preferably from 40 to 150 mL/min., per 1 L of the inner volume of the furnace.

By supplying air during the firing, M in the precursor will be sufficiently oxidized, whereby it is possible to obtain a composite oxide (1) having high crystallinity and having the desired crystal phase.

The firing temperature is usually from 500 to 1,000° C. The firing temperature is preferably at most 1,000° C., more preferably at most 970° C., further preferably at most 950° C., whereby the domain of Li(Li$_{1/3}$Mn$_{2/3}$)O$_2$ tends to scarcely grow, and it is easy to form a composite oxide (1) having $H_{020}/H_{003}$ of at most 0.038 and $H_{110}/H_{003}$ of at most 0.013. In order to obtain the desired object, the firing temperature is preferably at least 600° C., more preferably at least 700° C., further preferably at least 740° C.

The firing time is preferably from 4 to 40 hours, more preferably from 4 to 20 hours.

The firing may be one-stage firing or two-stage firing i.e. temporary firing followed by main firing. The two-stage firing is preferred since Li thereby tends to be readily uniformly dispersed in the composite oxide (1).

The temperature for the temporary firing is preferably from 400 to 700° C., more preferably from 500 to 650° C.

The temperature for the main firing is preferably from 600 to 915° C., more preferably from 700 to 910° C., further preferably from 740 to 900° C.

Step (c)

The method for forming the covering (2) may, for example, be a powder mixing method, a gas phase method, a spray coating method or a dipping method. The following description will be made with reference to a case where the covering (2) is an Al compound.

The powder mixing method is a method of mixing the composite oxide (1) and the Al compound, followed by heating. The gas phase method is a method of gasifying an organic compound containing Al, such as aluminum ethoxide, aluminum isopropoxide or aluminum acetylacetonate, and letting the organic compound be in contact with the surface of the composite oxide (1) and reacted. The spray coating method is a method of spraying a solution containing Al to the composite oxide (1), followed by heating.

Otherwise, a covering (2) containing an Al compound may be formed on the surface of the composite oxide (1) by contacting to the composite oxide (1), e.g. by a spray coating method, an aqueous solution having dissolved in a solvent, a water-soluble Al compound (such as aluminum acetate, aluminum oxalate, aluminum citrate, aluminum lactate, basic aluminum lactate or aluminum nitrate) to form an Al compound, followed by heating to remove the solvent.

Function and Mechanism

The above-described present active material is a so-called lithium rich cathode active material containing, as the main component, a composite oxide represented by $aLi(Li_{1/3}Mn_{2/3})O_2 \cdot (1-a)LiMO_2$, whereby it is possible to obtain a lithium ion secondary battery excellent in the discharge capacity. Further, in the above-described present active material, in the composite oxide (1), $H_{020}/H_{003}$ is at most 0.038 and $H_{110}/H_{003}$ is at most 0.013, whereby it is considered that the crystallinity of $Li(Li_{1/3}Mn_{2/3})O_2$ will be low, and the diffusivity of Li ions in the Li excess phase will be good. As a result, the present active material is capable of obtaining a lithium ion secondary battery excellent in the rate characteristics.

Positive Electrode for Lithium Ion Secondary Battery

The positive electrode for a lithium ion secondary battery of the present invention (hereinafter referred to as the present positive electrode) contains the present active material. Specifically, it has a cathode active material layer comprising the present active material, an electrically conductive material and a binder, formed on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

The present positive electrode may be produced, for example, by the following method.

The present active material, the electrically conductive material and the binder are dissolved or dispersed in a medium to obtain a slurry. The obtained slurry is applied to the positive electrode current collector, and the medium is removed e.g. by drying to form a layer of the cathode active material. As the case requires, the layer of the cathode active material may be pressed e.g. by roll pressing. The present positive electrode is obtained in such a manner.

Otherwise, the present active material, the electrically conductive material and the binder are kneaded with a medium to obtain a kneaded product. The obtained kneaded product is pressed on the positive electrode current collector to obtain the present positive electrode.

Function and Mechanism

The above-described present positive electrode contains a so-called lithium rich cathode active material composed mainly of a composite oxide represented by $aLi(Li_{1/3}Mn_{2/3})O_2 \cdot (1-a)LiMO_2$, whereby it is possible to obtain a lithium ion secondary battery excellent in the discharge capacity. Further, in the above-described present positive electrode, in the composite oxide (1), $H_{020}/H_{003}$ is at most 0.038 and Hilo/Ha:2 is at most 0.013, i.e. it contains the present active material wherein the crystallinity of $Li(Li_{1/3}Mn_{2/3})O_2$ is low, and the diffusivity of Li ions in the Li excess phase is good, whereby it is possible to obtain a lithium ion secondary battery excellent in the rate characteristics.

Lithium Ion Secondary Battery

The lithium ion secondary battery of the present invention (hereinafter referred to as the present battery) has the present positive electrode. Specifically, it comprises the present positive electrode, a negative electrode and a non-aqueous electrolyte.

Negative Electrode

The negative electrode contains an anode active material. Specifically, it has an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si.

As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used.

As the negative electrode current collector, a metal foil such as a nickel foil or a copper foil may be mentioned.

The negative electrode may be produced, for example, by the following method.

The anode active material, the electrically conductive material and the binder are dissolved or dispersed in a medium to obtain a slurry. The obtained slurry is applied to the negative electrode current collector, and the medium is removed e.g. by drying, followed by pressing to obtain the negative electrode.

Non-Aqueous Electrolyte

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed or dissolved.

The organic solvent may be an organic solvent known for a non-aqueous electrolytic solution. Specifically, it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dim ethyl carbonate or diethyl carbonate). As the organic solvent, one type may be used alone, or two or more types may be used in combination.

As the inorganic solid electrolyte, a material having lithium ion conductivity may be used.

The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. As the polymer compound, one type may be used alone, or two or more types may be used in combination.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

Function and Mechanism

The above-described present battery has the present positive electrode, whereby it is excellent in the discharge capacity and also excellent in the rate characteristics even if the proportion of Co is low in the present active material.

EXAMPLES

Now, the present invention will be described in detail with reference to Examples, but it should be understood that the present invention is by no means thereby restricted. Ex. 1 to 9 are Examples of the present invention, and Ex. 10 to 15 are Comparative Examples.

Particle Size

The hydroxide or the cathode active material was sufficiently dispersed in water by ultrasonic treatment, and the measurement was conducted by a laser diffraction/scattering type particle size distribution measuring apparatus (MT-3300EX manufactured by NIKKISO CO., LTD.), to obtain the frequency distribution and accumulative volume distribution curve, whereby the volume-based particle size distribution was obtained. From the obtained accumulative volume distribution curve, $D_{50}$ was obtained.

Specific Surface Area

The specific surface area of the hydroxide or the cathode active material was calculated by a nitrogen adsorption BET method using a specific surface area measuring apparatus (HM model-1208, manufactured by Mountech Co., Ltd.). Degassing was carried out at 200° C. for 20 minutes.

Composition Analysis

Composition analysis of the lithium-containing composite oxide as a cathode active material was carried out by a plasma emission spectroscope (SPS3100H manufactured by SII NanoTechnology Inc.). From the ratio of the molar amounts of Li, Ni, Co and Mn obtained from the composition analysis, a, α, β and γ in $aLi(Li_{1/3}Mn_{2/3})O_2 \cdot (1-a) LiNi_\alpha Co_\beta Mn_{65}O_2$ were calculated.

X-ray Diffraction

The X-ray diffraction of the lithium-containing composite oxide as a cathode active material was measured by means of an X-ray diffraction apparatus (manufactured by Rigaku Corporation, apparatus name: SmartLab). The measurement conditions are shown in Table 1. The measurement was carried out at 25° C. Before the measurement, 1 g of the lithium-containing composite oxide and 30 mg of standard sample 640d for X-ray diffraction were mixed in an agate mortar, and this mixture was used as the sample for the measurement. With respect to the obtained X-ray diffraction pattern, peak search was carried out using integrated X-ray powder diffraction software PDXL2 manufactured by Rigaku Corporation. From the respective peaks, $D_{003}$, $D_{110}$, $H_{020}$, $H_{110}$, $H_{003}$ and $W_{020}$ were obtained.

TABLE 1

| | | |
|---|---|---|
| Apparatus condition | Measurement apparatus | SmartLab manufactured by Rigaku Corporation |
| | Target | Cu |
| | Detector | D/teX Ultra HE manufactured by Rigaku Corporation |
| | Detector baseline | 44 div |
| | Detector window | 8 div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |

TABLE 1-continued

| | | |
|---|---|---|
| Sample condition | Sample holder | Diameter: 24 mm, depth: 0.5 mm |
| | Rotation of sample during measurement | Rotated (30 rpm) |
| Measurement condition | Measurement method | General purpose measurement (focal method) |
| | Scanning axis | 2θ/θ |
| | Mode | Continuous |
| | Range specification | Absolute |
| | Initiation (deg.) | 15 (deg.) |
| | Termination (deg.) | 75 (deg.) |
| | Step (deg.) | 0.0052 (deg.) |
| | Speed measurement time | 1 (deg./min.) |
| | IS (deg.) | 1/3 (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data processing condition | Analysis software | PDXL2 manufactured by Rigaku Corporation |
| | Smoothing | Smoothing by B-Spline, χ threshold: 1.50 |
| | Background removal | Fitting |
| | Kα2 removal | Intensity ratio: 0.4970 |
| | Peak search | Secondary differentiation σ cut: 3.00 |
| | Profile fitting | Fitting of measurement data |
| | Peak shape | Variance pseudo-voigt function |

Production of Positive Electrode Sheet

The cathode active material obtained in each Ex., acetylene black as an electrically conductive material and polyvinylidene fluoride as a binder were weighed in a mass ratio of 80:10:10, and they were added to N-methylpyrrolidone to prepare a slurry.

The slurry was applied on one side of an aluminum foil as a positive electrode current collector having a thickness of 20 μm by means of a doctor blade. The gap of the doctor blade was adjusted so that the thickness of the sheet after roll pressing would be 30 μm. After drying at 120° C., roll pressing was carried out twice to prepare a positive electrode sheet.

Production of Lithium Secondary Battery

One having the positive electrode sheet punched out in a circular shape with a diameter of 18 mm, was used as a positive electrode.

On one side of a stainless steel plate having a thickness of 1 mm as a negative electrode current collector, a metal lithium foil having a thickness of 500 μm was formed and used as a negative electrode.

As a separator, a porous polypropylene having a thickness of 25 μm was used.

As an electrolytic solution, a liquid having $LiPF_6$ dissolved at a concentration of 1 mol/dm$^3$ in a solvent mixture of ethylene carbonate and diethyl carbonate in a volume ratio of 1:1, was used.

Using the positive electrode, negative electrode, separator and aqueous electrolytic solution, a stainless steel simple sealed cell type lithium secondary battery was assembled in an argon globe box.

Activation Treatment

With respect to the lithium secondary battery using the cathode active material in each of Ex. 1 to 6 and 10 to 12, constant current charging to 4.6 V with a load current of 20 mA per 1 g of the cathode active material, followed by discharging to 2.0 V with a load current of 200 mA per 1 g of the cathode active material, was repeated twice. Then, constant current charging was carried out to 4.7 V with a load current of 200 mA per 1 g of the cathode active material, followed by constant voltage charging until the load current became 1 mA per 1 g of the cathode active material. Thereafter, discharging was carried out to 2.0 V with a load current of 20 mA per 1 g of the cathode active material. The sum of the irreversible capacities at the first two times and the charge capacity at the last charging, was taken as the initial charge capacity, and the discharge capacity at the last discharging was taken as the initial discharge capacity.

With respect to the lithium secondary battery using the cathode active material in each of Ex. 7 to 9 and 13 to 15, constant current charging was carried out to 4.6 V with a load current of 20 mA per 1 g of the cathode active material, followed by constant voltage charging until the load current became 1 mA per 1 g of the cathode active material. Thereafter, discharging was carried out to 2.0 V with a load current of 20 mA per 1 g of the cathode active material. The charge capacity and the discharge capacity at the charging and the discharging were measured.

Rate Characteristics

With respect to the activation-treated lithium secondary battery in each of Ex. 1 to 6 and 10 to 15, constant current charging was carried out to 4.6 V with a load current of 40 mA (0.2C) per 1 g of the cathode active material, followed by constant voltage charging at 4.6 V until the load current became 1.4 mA per 1 g of the cathode active material. Thereafter, discharging was carried out to 2 V with a load current of 40 mA per 1 g of the cathode active material. Then, constant current charging was carried out to 4.6 V with a load current of 40 mA (0.2C) per 1 g of the cathode active material, followed by constant voltage charging at 4.6 V until the load current became 1.4 mA per 1 g of the cathode active material. Thereafter, discharging was carried out to 2 V with a load current of 600 mA (3C) per 1 g of the cathode active material.

With respect to the activation-treated lithium secondary battery in each of Ex. 7 to 9, constant current charging was carried out to 4.5 V with a load current of 40 mA (0.2C) per 1 g of the cathode active material, followed by constant voltage charging at 4.5 V until the load current became 1.4 mA per 1 g of the cathode active material. Thereafter, discharging was carried out to 2 V with a load current of 40 mA per 1 g of the cathode active material. Then, constant current charging was carried out to 4.5 V with a load current of 40 mA (0.2C) per 1 g of the cathode active material, followed by constant voltage charging at 4.5 V until the load current became 1.4 mA per 1 g of the cathode active material. Thereafter, discharging was carried out to 2 V with a load current of 600 mA (3C) per 1 g of the cathode active material.

With respect to Ex. 1 to 15, the rate retention (%) was obtained by the following formula, from the discharge capacity at 0.2C and the discharge capacity at 3C.

Rate retention (%)=Discharge capacity at 3C/discharge capacity at 0.2C×100

Ex. 1

Nickel(II) sulfate hexahydrate and manganese(II) sulfate pentahydrate were dissolved in distilled water so that the molar ratio of Ni and Mn would be as shown in Table 2 and the total amount of the sulfates would be 1.5 mol/kg to obtain an aqueous sulfate solution.

As a pH adjusting solution, sodium hydroxide was dissolved in distilled water so that the concentration would be 1.5 mol/kg to obtain an aqueous sodium hydroxide solution.

As a complexing agent, ammonium sulfate was dissolved in distilled water so that the concentration would be 1.5 mol/kg to obtain an aqueous ammonium sulfate solution.

Step (a)

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/min and the aqueous ammonium sulfate solution was added at a rate of 0.25 g/m in, for 10 hours, and the pH adjusting solution was added to maintain the pH of the mixed solution to be 10.5, to precipitate hydroxides containing Ni and Mn. During the addition of the raw material solutions, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxides, pressure filtration and dispersion in distilled water were repeated for washing. Washing was completed at a point where the electrical conductivity of the filtrate became 20 mS/m, and the hydroxides were dried at 120° C. for 15 hours.

Step (b)

The hydroxides and lithium carbonate were mixed so that the ratio in molar amount of Li to M (M is Ni and Mn) (i.e. Li/X$_2$) would be 1.540, to obtain a mixture.

In an electric furnace, while supplying air, the mixture was subjected to temporary firing at 600° C. in air over a period of 5 hours to obtain a temporarily fired product.

Figure 3:
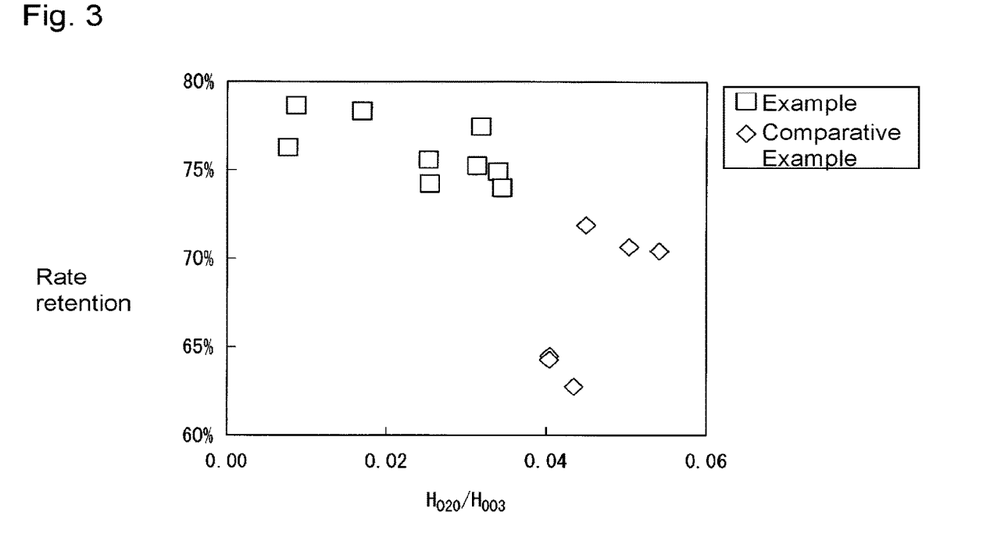
FIG. 3 is a graph showing a relation between $H_{020}/H_{003}$ and the rate retention.
Figure 4:
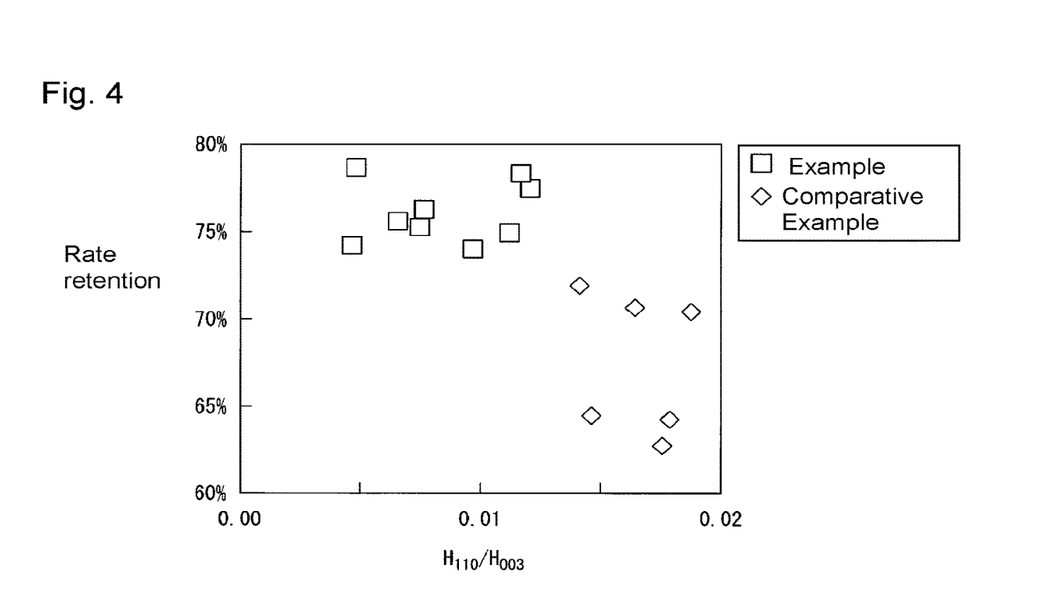
FIG. 4 is a graph showing a relation between $H_{110}/H_{003}$ and the rate retention.
Figure 5:
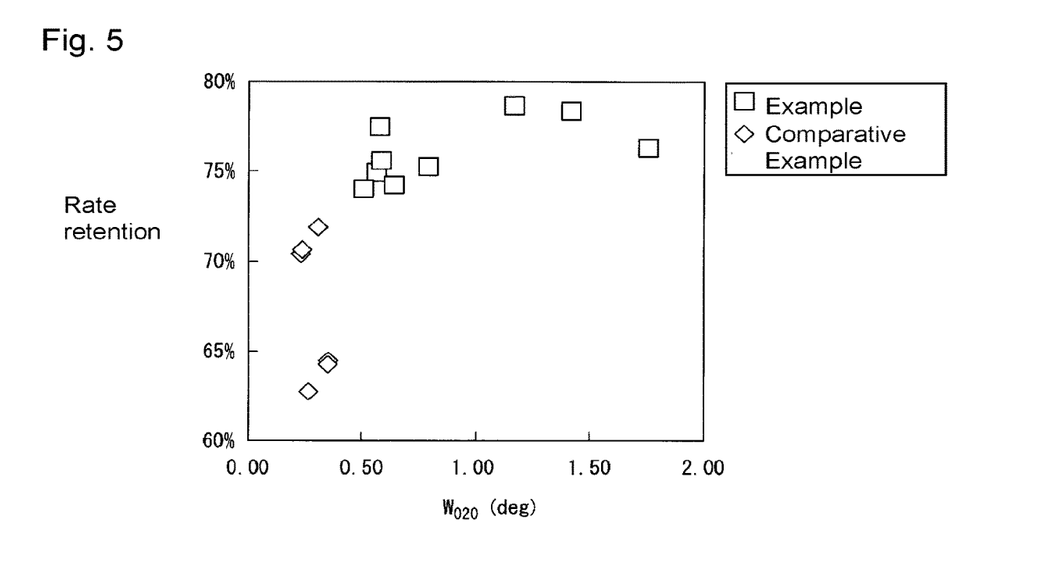
FIG. 5 is a graph showing a relation between the integral breadth ($W_{020}$) of a peak of (020) plane assigned to a crystal structure with space group C2/m in an X-ray diffraction pattern of the lithium-containing composite oxide and the rate retention.

In an electric furnace, while supplying air, the temporarily fired product was subjected to main firing at 860° C. in air over a period of 16 hours to obtain a lithium-containing composite oxide. This lithium-containing composite oxide was used as a cathode active material. The results are shown in Tables 2, 3 and 4. The relation between $H_{020}/H_{003}$ and the rate retention is shown in FIG. 3. The relation between $H_{110}/H_{003}$ and the rate retention is shown in FIG. 4. The relation between $W_{202}$ and the rate retention is shown in FIG. 5.

Ex. 2 to 4 and 10 to 15

Figure 1:
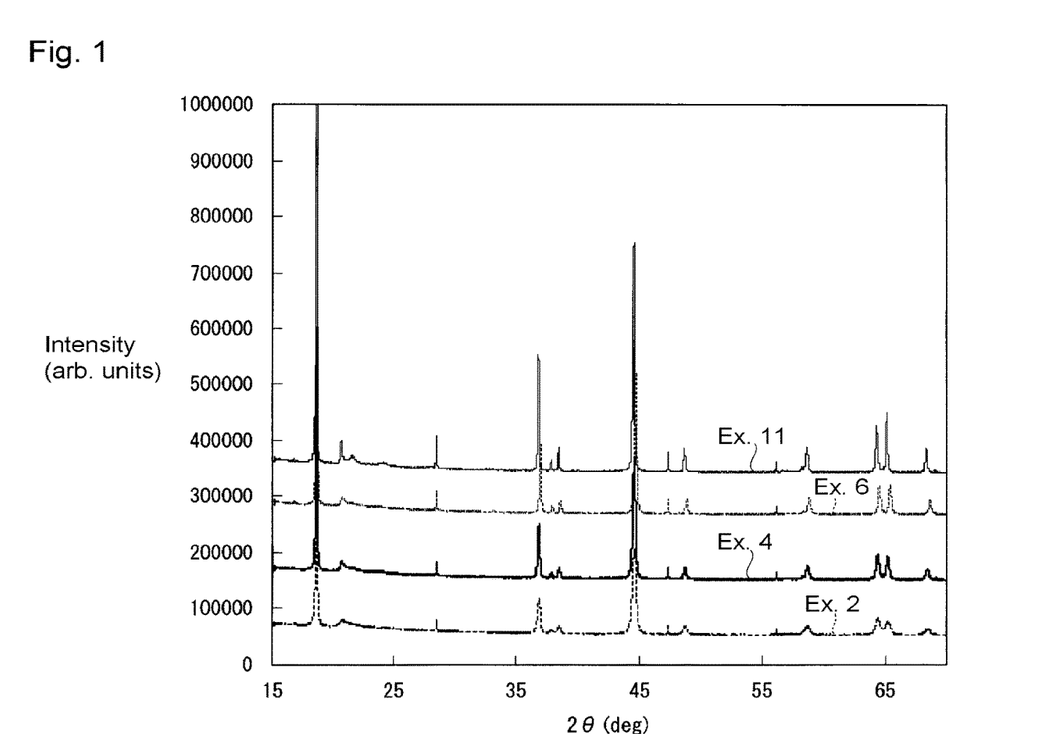
FIG. 1 is a graph showing X-ray diffraction patterns of the cathode active materials in Ex. 2, 4, 6 and 11.
Figure 2:
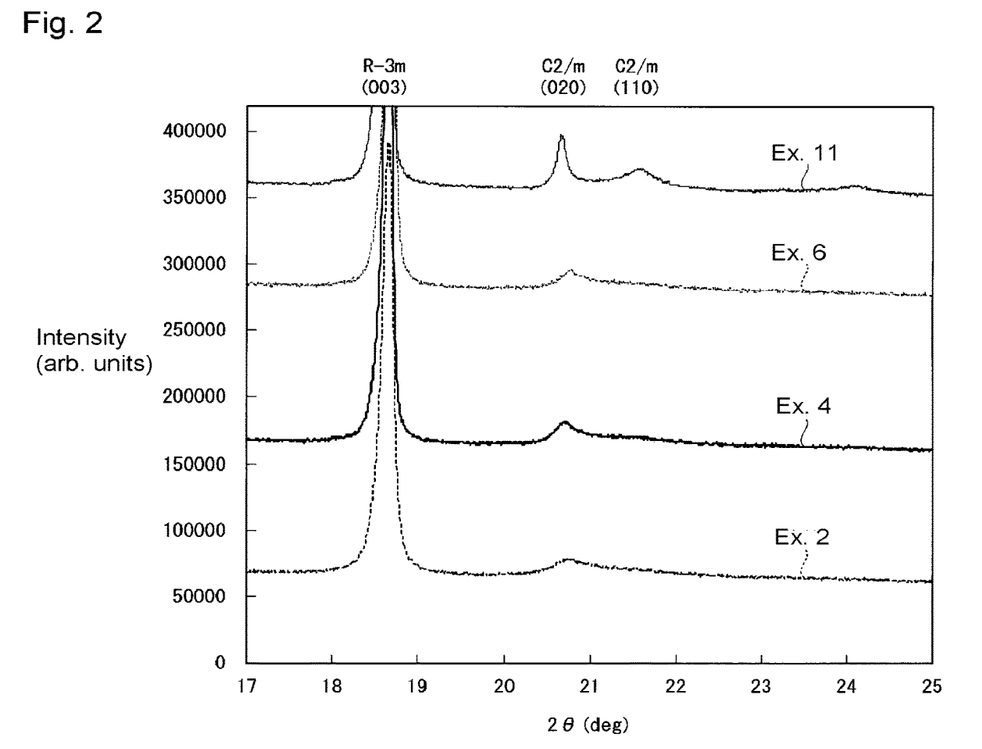
FIG. 2 is a graph having a part of FIG. 1 enlarged.

Lithium-containing composite oxides in Ex. 2 to 4 and 10 to 15 were obtained in the same manner as in Ex. 1 except that the conditions were changed as shown in Tables 2 and 3. The lithium-containing composite oxides were used as cathode active materials. The results are shown in Tables 2, 3 and 4. The X-ray diffraction patterns of the cathode active materials in Ex. 2, 6 and 11 are shown in FIG. 1 and FIG. 2. The relation between $H_{020}/H_{003}$ and the rate retention in each of Ex. 2 to 4 and 10 to 15, is shown in FIG. 3. The relation between $H_{110}/H_{003}$ and the rate retention in each of Ex. 2 to 4 and 10 to 15, is shown in FIG. 4. The relation between $W_{020}$ and the rate retention in each of Ex. 2 to 4 and 10 to 15, is shown in FIG. 5.

Ex. 5

Nickel(II) sulfate hexahydrate, cobalt(II) sulfate heptahydrate and manganese(II) sulfate pentahydrate were dissolved in distilled water so that the molar ratio of Ni, CO and Mn would be as shown in Table 2 and the total amount of the sulfates would be 1.5 mol/kg to obtain an aqueous sulfate solution.

As a pH adjusting solution, sodium hydroxide was dissolved in distilled water so that the concentration would be 1.5 mol/kg to obtain an aqueous sodium hydroxide solution.

As a complexing agent, ammonium sulfate was dissolved in distilled water so that the concentration would be 1.5 mol/kg to obtain an aqueous ammonium sulfate solution.

Step (a):

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/min and the aqueous ammonium sulfate solution was added at a rate of 0.5 g/m in, for 14 hours, and the pH adjusting solution was added to maintain the pH of the mixed solution to be 10.5, to precipitate hydroxides containing Ni, Co and Mn. During the addition of the raw material solutions, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxides, pressure filtration and dispersion in distilled water were repeated for washing. Washing was completed at a point where the electrical conductivity of the filtrate became 20 mS/m, and the hydroxides were dried at 120° C. for 15 hours.

Step (b)

The hydroxides and lithium carbonate were mixed so that the ratio in molar amount of Li to M (M is Ni, Co and Mn) (i.e. Li/X$_2$) would be 1.580, to obtain a mixture.

In an electric furnace, while supplying air, the mixture was subjected to temporary firing at 600° C. in air over a period of 5 hours to obtain a temporarily fired product.

In an electric furnace, while supplying air, the temporarily fired product was subjected to main firing at 860° C. in air over a period of 16 hours to obtain a lithium-containing composite oxide. This lithium-containing composite oxide was used as a cathode active material. The results are shown in Tables 2, 3 and 4. The relation between $H_{020}/H_{003}$ and the rate retention is shown in FIG. 3. The relation between $H_{110}/H_{003}$ and the rate retention is shown in FIG. 4. The relation between $W_{020}$ and the rate retention is shown in FIG. 5.

Ex. 6 to 9

Lithium-containing composite oxides in Ex. 6 to 9 were obtained in the same manner as in Ex. 5 except that the conditions were changed as shown in Tables 2 and 3. The lithium-containing composite oxides were used as cathode active materials. The results are shown in Tables 2, 3 and 4. The X-ray diffraction pattern of the cathode active material in Ex. 6 is shown in FIG. 1 and FIG. 2. The relation between $H_{020}/H_{003}$ and the rate retention in each of Ex.6 to 9, is shown in FIG. 3. The relation between $H_{110}/H_{003}$ and the rate retention in each of Ex. 6 to 9, is shown in FIG. 4. The relation between $W_{020}$ and the rate retention in each of Ex. 6 to 9, is shown in FIG. 5.

TABLE 2

| | Step (a) | | | | | | | | | Hydroxides | |
|---|---|---|---|---|---|---|---|---|---|---|---|
| | Charge [mol %] | | | Complexing agent | | Initial | Controlled | Time | Temperature | $D_{50}$ | Specific surface area |
| Ex. | Ni | Co | Mn | Type | $NH_4/X_2$ | pH | pH | [hr] | [° C.] | [μm] | [$m^2/g$] |
| 1 | 25.00 | 0.00 | 75.00 | Ammonium sulfate | 0.05 | 10.5 | 10.5 | 10 | 50 | 8.0 | 24.8 |
| 2 | 25.00 | 0.00 | 75.00 | Ammonium sulfate | 0.05 | 10.5 | 10.5 | 10 | 50 | 8.0 | 24.8 |
| 3 | 25.00 | 0.00 | 75.00 | Ammonium sulfate | 0.05 | 10.5 | 10.5 | 10 | 50 | 8.0 | 24.8 |
| 4 | 25.00 | 0.00 | 75.00 | Ammonium sulfate | 0.05 | 10.5 | 10.5 | 10 | 50 | 8.0 | 24.8 |
| 5 | 18.75 | 12.50 | 68.75 | Ammonium sulfate | 0.10 | 10.5 | 10.5 | 14 | 50 | 6.6 | 38.6 |
| 6 | 18.75 | 12.50 | 68.75 | Ammonium sulfate | 0.10 | 10.5 | 10.5 | 14 | 50 | 6.6 | 38.6 |
| 7 | 38.57 | 8.57 | 52.86 | Ammonium sulfate | 0.50 | 7 | 11 | 14 | 50 | 4.7 | 14.5 |
| 8 | 38.57 | 8.57 | 52.86 | Ammonium sulfate | 0.10 | 7 | 11 | 14 | 30 | 6.0 | 17.4 |
| 9 | 38.57 | 8.57 | 52.86 | Ammonium sulfate | 0.10 | 7 | 10.5 | 14 | 50 | 6.3 | 19.8 |
| 10 | 25.00 | 0.00 | 75.00 | Ammonium sulfate | 0.10 | 7 | 11 | 14 | 50 | 4.7 | 37.1 |
| 11 | 25.00 | 0.00 | 75.00 | Ammonium sulfate | 0.10 | 7 | 11 | 14 | 50 | 4.7 | 37.1 |
| 12 | 25.00 | 0.00 | 75.00 | Ammonium sulfate | 0.05 | 10.5 | 10.5 | 10 | 50 | 8.0 | 24.8 |
| 13 | 30.00 | 0.00 | 70.00 | Ammonium sulfate | 0.10 | 10.5 | 10.5 | 28 | 50 | 5.4 | 22.2 |
| 14 | 30.00 | 0.00 | 70.00 | Ammonium sulfate | 0.10 | 10.5 | 10.5 | 28 | 50 | 5.4 | 22.2 |
| 15 | 30.00 | 0.00 | 70.00 | Ammonium sulfate | 0.10 | 10.5 | 10.5 | 28 | 50 | 5.4 | 22.2 |

TABLE 3

| | Step (b) | | | | | Cathode active material (lithium-containing composite oxide) | | | | | | |
|---|---|---|---|---|---|---|---|---|---|---|---|---|
| | | Temporary firing | | Main firing | | Analyzed composition | | | $a$Li(Li$_{1/3}$Mn$_{2/3}$)O$_2$•(1 − $a$)LiNi$_\alpha$Co$_\beta$Mn$_\gamma$O$_2$ | | | |
| | Charge | Temperature | Time | Temperature | Time | | | | | | | |
| Ex. | Li/$X_2$ | [° C.] | [hr] | [° C.] | [hr] | Ni/X | Co/X | Mn/X | a | α | β | γ |
| 1 | 1.540 | 600 | 5 | 860 | 16 | 0.250 | 0.00 | 0.750 | 0.64 | 0.54 | 0.00 | 0.46 |
| 2 | 1.580 | 600 | 5 | 860 | 16 | 0.250 | 0.00 | 0.750 | 0.67 | 0.60 | 0.00 | 0.40 |
| 3 | 1.580 | 600 | 5 | 890 | 16 | 0.250 | 0.00 | 0.750 | 0.67 | 0.60 | 0.00 | 0.40 |
| 4 | 1.580 | 600 | 5 | 935 | 16 | 0.250 | 0.00 | 0.750 | 0.67 | 0.60 | 0.00 | 0.40 |
| 5 | 1.580 | 600 | 5 | 860 | 16 | 0.188 | 0.124 | 0.688 | 0.67 | 0.45 | 0.30 | 0.26 |
| 6 | 1.580 | 600 | 5 | 890 | 16 | 0.188 | 0.124 | 0.688 | 0.67 | 0.45 | 0.30 | 0.26 |
| 7 | 1.150 | Nil | Nil | 845 | 12 | 0.387 | 0.085 | 0.528 | 0.21 | 0.45 | 0.10 | 0.45 |
| 8 | 1.160 | Nil | Nil | 815 | 12 | 0.385 | 0.086 | 0.529 | 0.22 | 0.46 | 0.10 | 0.44 |
| 9 | 1.160 | 600 | 5 | 740 | 16 | 0.390 | 0.084 | 0.526 | 0.22 | 0.46 | 0.10 | 0.44 |
| 10 | 1.540 | 600 | 5 | 950 | 16 | 0.250 | 0.00 | 0.750 | 0.64 | 0.54 | 0.00 | 0.46 |
| 11 | 1.540 | 600 | 5 | 1000 | 16 | 0.250 | 0.00 | 0.750 | 0.64 | 0.54 | 0.00 | 0.46 |
| 12 | 1.500 | 600 | 5 | 935 | 16 | 0.250 | 0.00 | 0.750 | 0.60 | 0.50 | 0.00 | 0.50 |
| 13 | 1.400 | 600 | 5 | 895 | 16 | 0.299 | 0.00 | 0.701 | 0.50 | 0.50 | 0.00 | 0.50 |
| 14 | 1.400 | 600 | 5 | 920 | 16 | 0.299 | 0.00 | 0.701 | 0.50 | 0.50 | 0.00 | 0.50 |
| 15 | 1.380 | 600 | 5 | 920 | 16 | 0.299 | 0.00 | 0.701 | 0.48 | 0.48 | 0.00 | 0.52 |

TABLE 4

| | Cathode active material (lithium-containing composite oxide) | | | | | | | Lithium secondary battery | | |
|---|---|---|---|---|---|---|---|---|---|---|
| Ex. | $D_{50}$ [μm] | Specific surface area [$m^2/g$] | $D_{003}$ [nm] | $D_{110}$ [nm] | $H_{020}/H_{003}$ | $H_{110}/H_{003}$ | $W_{020}$ [deg] | Charge capacity [mAh/g] | Discharge capacity [mAh/g] | Rate retention [%] |
| 1 | 7.8 | 2.99 | 53.0 | 22.7 | 0.034 | 0.011 | 0.564 | 348.1 | 269.9 | 74.9 |
| 2 | 7.9 | 2.72 | 51.7 | 17.8 | 0.031 | 0.007 | 0.791 | 352.9 | 238.1 | 75.3 |
| 3 | 7.8 | 2.76 | 58.5 | 23.1 | 0.032 | 0.012 | 0.578 | 365.9 | 258.9 | 77.5 |
| 4 | 7.8 | 2.23 | 70.1 | 31.4 | 0.034 | 0.010 | 0.508 | 355.5 | 278.9 | 74.0 |
| 5 | 6.8 | 2.91 | 68.1 | 37.3 | 0.025 | 0.007 | 0.585 | 366.9 | 266.6 | 75.6 |
| 6 | 6.6 | 2.50 | 75.1 | 42.6 | 0.025 | 0.005 | 0.642 | 362.1 | 271.8 | 74.2 |
| 7 | 5.1 | 2.09 | 56.3 | 14.2 | 0.017 | 0.012 | 1.419 | 250.0 | 215.8 | 78.3 |
| 8 | 5.9 | 2.82 | 42.2 | 11.2 | 0.009 | 0.005 | 1.170 | 250.1 | 221.6 | 78.7 |
| 9 | 6.5 | 2.80 | 42.0 | 19.4 | 0.008 | 0.008 | 1.758 | 250.0 | 218.1 | 76.3 |
| 10 | 4.8 | 2.85 | 74.0 | 51.1 | 0.045 | 0.014 | 0.309 | 349.8 | 295.7 | 71.9 |
| 11 | 4.9 | 2.05 | 86.9 | 63.0 | 0.054 | 0.019 | 0.232 | 347.0 | 282.7 | 70.4 |
| 12 | 7.8 | 3.00 | 70.9 | 44.9 | 0.050 | 0.016 | 0.238 | 338.4 | 281.8 | 70.6 |
| 13 | 5.6 | 1.93 | 67.8 | 28.3 | 0.040 | 0.015 | 0.354 | 299.2 | 244.0 | 64.5 |
| 14 | 5.7 | 1.67 | 70.0 | 25.5 | 0.040 | 0.018 | 0.352 | 274.9 | 226.8 | 64.3 |
| 15 | 5.8 | 1.78 | 72.8 | 27.8 | 0.043 | 0.018 | 0.268 | 301.5 | 243.4 | 62.7 |

The lithium secondary batteries using the cathode active materials in Ex. 1 to 9 wherein $H_{020}/H_{003}$ was at most 0.038 and $H_{110}/H_{003}$ was at most 0.013, were excellent in the rate characteristics.

The lithium secondary batteries using the cathode active materials in Ex. 10 to 15 wherein $H_{020}/H_{003}$ exceeded 0.038 and $H_{110}/H_{003}$ exceeded 0.013, were inferior in the rate characteristics.

INDUSTRIAL APPLICABILITY

By the cathode active material of the present invention, it is possible to obtain a lithium ion secondary battery excellent in the discharge capacity and rate characteristics.

The entire disclosure of Japanese Patent Application No. 2015-011028 filed on Jan. 23, 2015 including specification, claims, drawings and summary is incorporated herein by reference in its entirety.

What is claimed is:

1. A cathode active material, comprising:
a lithium-containing composite oxide represented by $$aLi(Li_{1/3}Mn_{2/3})O_2 \cdot (1-a)LiMO_2,$$

wherein
M is Ni Co and/or Mn, and $$0 < a \leq 0.22 \text{ or } 0.64 \leq a < 1,$$

wherein, in an X-ray diffraction pattern of the lithium-containing composite oxide, the ratio ($H_{020}/H_{003}$) of the height ($H_{020}$) of a (020) plane peak assigned to a crystal structure with a C2/m space group to the height ($H_{003}$) of a (003) plane peak assigned to a crystal structure with an R-3m space group in a range of from 0.005 to 0.038, and wherein, in an X-ray diffraction pattern of the lithium-containing composite oxide, the ratio ($H_{110}/H_{003}$) of the height ($H_{110}$) of a (110) plane peak assigned to the crystal structure with the C2/m space group to the height ($H_{003}$) of the (003) plane peak assigned to the crystal structure with the R-3m space group is at most 0.013.

2. The material of claim 1, wherein, in the lithium-containing composite oxide, the ratio (Ni/X) of the molar amount of Ni to the total molar amount (X) of Ni, Co, and Mn is in a range of from 0.15 to 0.45,
wherein the ratio (Co/X) of the molar amount of Co to the total molar amount (X) of Ni, Co, and Mn is in a range of from 0 to 0.15, and
wherein the ratio (Mn/X) of the molar amount of Mn to the total molar amount (X) of Ni, Co, and Mn is in a range of from 0.55 to 0.85.

3. The material of claim 1, having a specific surface area in a range of from 0.5 $m^2/g$ to 4 $m^2/g$.

4. The material of claim 1, having a volume-based accumulative 50% size ($D_{50}$) in a range of from 3 μm to 15 μm.

5. The material of claim 1, wherein, in an X-ray diffraction pattern of the lithium-containing composite oxide, the crystallite diameter obtained by the Scherrer equation from the (003) plane peak assigned to the crystal structure with the R-3m space group is in a range of from 30 nm to 120 nm.

6. The material of claim 1, wherein, in an X-ray diffraction pattern of the lithium-containing composite oxide, the crystallite diameter obtained by the Scherrer equation from the (110) plane peak assigned to the crystal structure with the R-3m space group is in a range of from 10 nm to 80 nm.

7. A positive electrode configured for a lithium ion secondary battery, comprising:
the cathode active material of claim 1;
an electrically conductive material; and
a binder.

8. A lithium ion secondary battery, comprising:
the electrode of claim 7;
a negative electrode; and
a non-aqueous electrolyte.

9. The material of claim 1, wherein, in the lithium-containing composite oxide M comprises Co and optionally Ni and/or Mn.

10. The material of claim 1, wherein, in the lithium-containing composite oxide, $$0.2 \leq a \leq 0.22.$$

11. The material of claim 1, wherein, in the lithium-containing composite oxide, $$0 < a \leq 0.22.$$

12. The material of claim 1, wherein, in the lithium-containing composite oxide,
M is $Ni_\alpha Co_\beta Mn_\gamma$,
α is in a range of from 0.5 to 0.833,
β is in a range from 0 to 0.75,
γ is in a range of from 0.167 to 0.5, and
α>γ.

13. The material of claim 1, wherein the ratio ($H_{020}/H_{003}$) is in a range of from 0.005 to 0.0365.

14. The material of claim 1, wherein the ratio ($H_{020}/H_{003}$) is in a range of from 0.005 to 0.035.

15. The material of claim 1, wherein the ratio ($H_{110}/H_{003}$) is at most 0.0126.

16. The material of claim 1, wherein the ratio ($H_{110}/H_{003}$) is at most 0.0122.

17. The material of claim 1, wherein, in an X-ray diffraction pattern of the lithium-containing composite oxide, the crystallite diameter obtained by the Scherrer equation from the (003) plane peak assigned to the crystal structure with the R-3m space group is in a range of from 50 nm to 110 nm.

18. The material of claim 1, wherein, in an X-ray diffraction pattern of the lithium-containing composite oxide, the crystallite diameter obtained by the Scherrer equation from the (003) plane peak assigned to the crystal structure with the R-3m space group is in a range of from 15 nm to 70 nm.

19. The material of claim 1, having a volume-based accumulative 50% size ($D_{50}$) in a range of from 3 μm to 12 μm.

20. The material of claim 1, wherein the volume-based accumulative 50% size ($D_{50}$) in a range of from 3 μm to 10 μm.

21. The material of claim 1, wherein, in the lithium-containing composite oxide, $0.64 \leq a < 1$.

22. The material of claim 1, wherein, in the lithium-containing composite oxide, $0.64 \leq a \leq 0.75$.

* * * * *